Nov. 28, 1933.  W. H. BASELT  1,936,898
BRAKE RIGGING
Original Filed Jan. 31, 1930   3 Sheets-Sheet 1
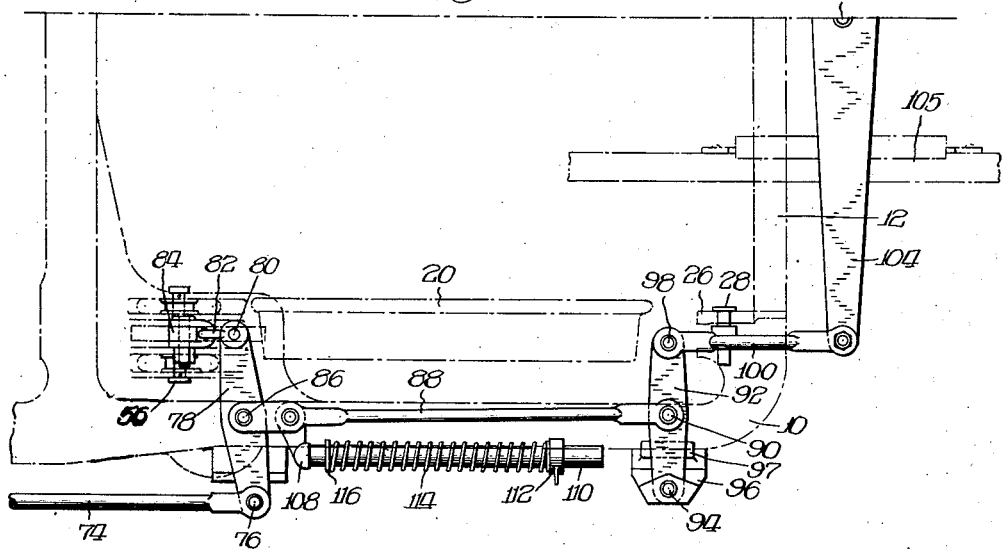
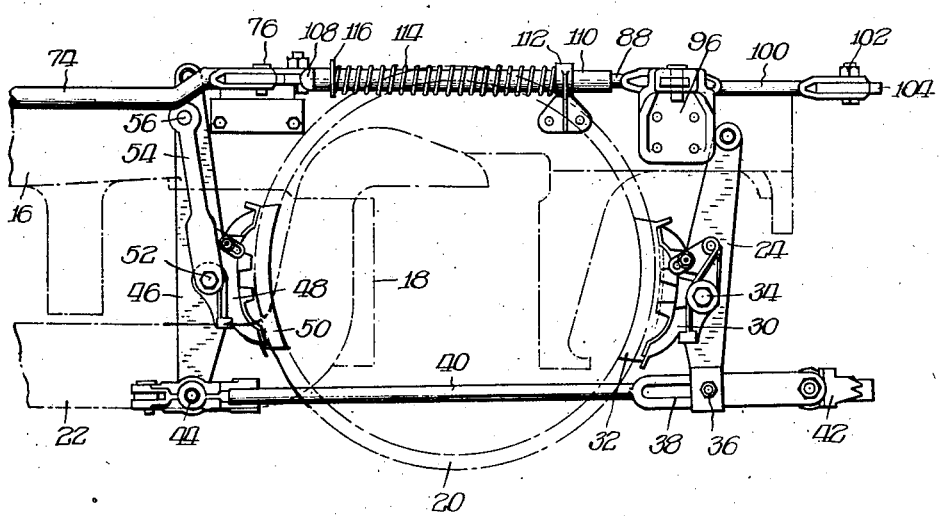
Inventor
Walter H Baselt,
By Wilkinson, Huxley, Byron & Knight
Attys Nov. 28, 1933.  W. H. BASELT  1,936,898
BRAKE RIGGING
Original Filed Jan. 31, 1930   3 Sheets-Sheet 2
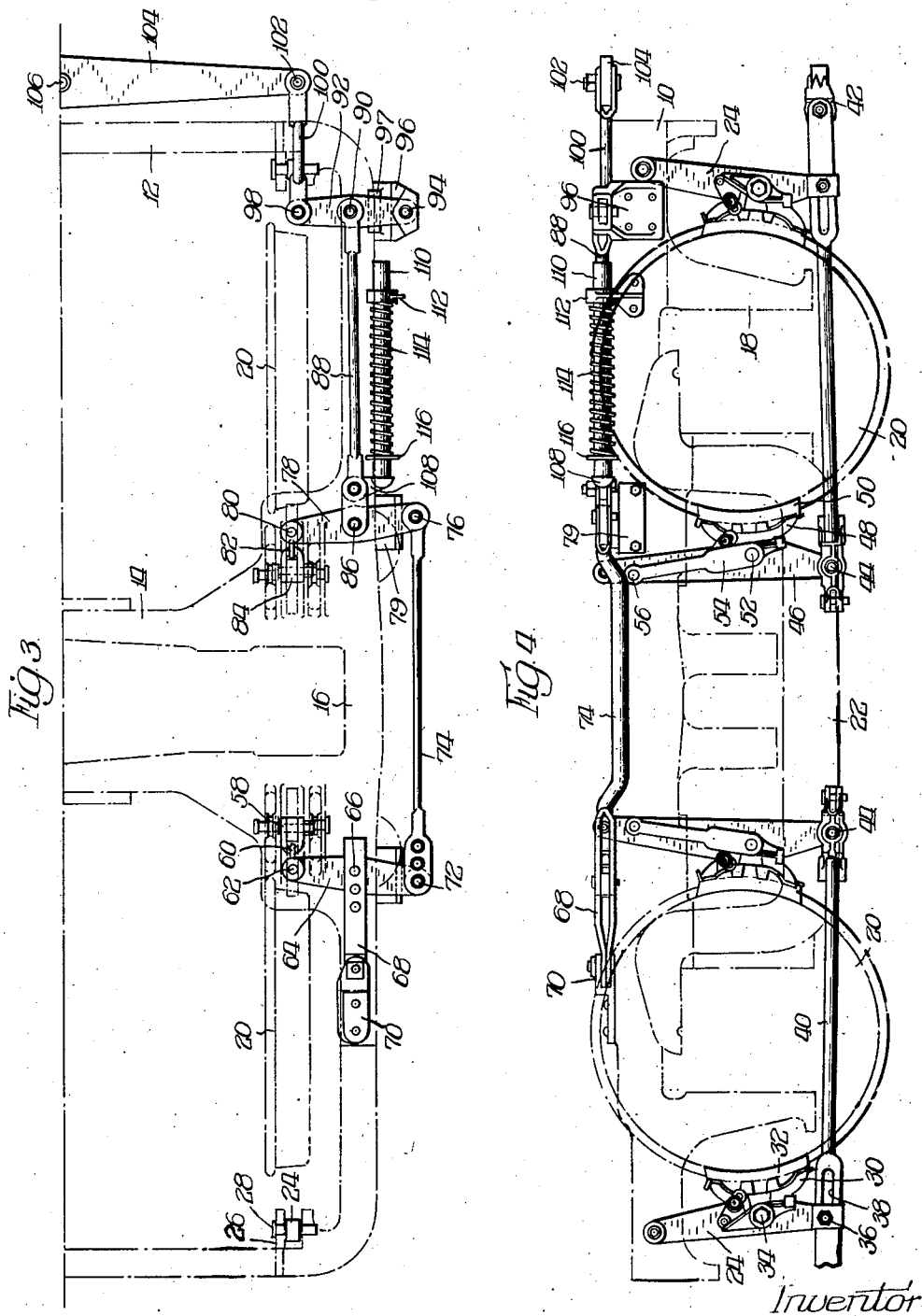
Inventor:
Walter H. Baselt,
By Wilkinson, Huxley, Byron & Knight
attys.

Nov. 28, 1933.     W. H. BASELT     1,936,898
BRAKE RIGGING
Original Filed Jan. 31, 1930    3 Sheets-Sheet 3
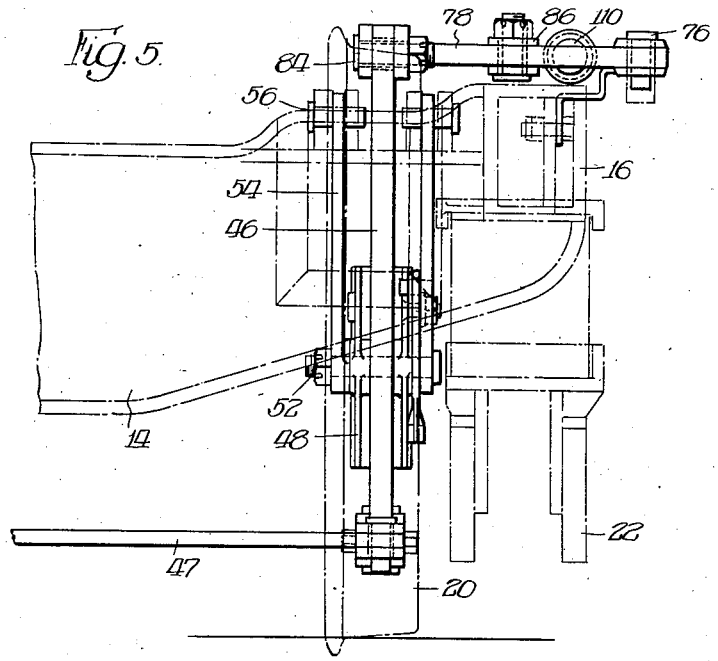
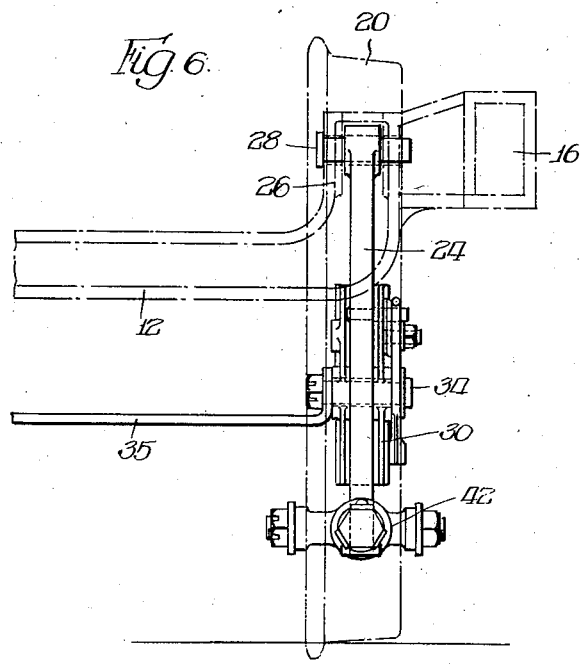
Inventor
Walter H Baselt, Patented Nov. 28, 1933

1,936,898

UNITED STATES PATENT OFFICE 1,936,898

BRAKE RIGGING

Walter H. Baselt, Chicago, Ill., assignor to American Steel Foundries, Chicago, Ill., a corporation of New Jersey Original application January 31, 1930, Serial No. 424,806. Divided and this application April 2, 1932. Serial No. 602,706

30 Claims. (Cl. 188—56)

The invention relates to brake rigging for railway car trucks and has reference particularly to a beamless type of rigging, having associated therewith that type of brake in which a brake shoe is applied to opposite sides of a car wheel and known as a clasp brake.

One of the objects of the present invention is to provide a type of brake rigging especially adapted to meet service conditions prevailing in railway motor trucks, wherein it is necessary to provide sufficient space for parts attached to the underframe.

Yet another object is to provide a brake rigging in which the live truck levers are so connected to the truck and to the brake rigging that should certain links or connections fail, the levers will not fall on the tracks.

Still another object is to provide in a brake system of the type described, release mechanism which will allow efficient operation of the brakes but which will, after application of the brakes, serve to return the operating parts of the rigging to released position.

A still further object of the invention is to provide in a brake system as described, a release mechanism adapted to return the operative parts of the mechanism to release position, which will be spring actuated and of extreme simplicity in construction.

A yet further object is to provide a brake rigging of simple construction which will be light in weight and effective and positive in operation.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a railway car truck equipped with brake rigging embodying the invention;

Figure 2 is a fragmentary side elevation of the construction shown in Figure 1;

Figure 3 is a top plan view of a railway car truck showing the application thereto of a brake system embodying the invention;

Figure 4 is a side elevation of the truck construction and brake rigging shown in Figure 3;

Figure 5 is a transverse fragmentary sectional elevation of the brake rigging taken substantially in the plane of the transverse center line of the truck;

Figure 6 is a transverse fragmentary end elevation of the brake rigging, taken at the left as viewed in Figures 1 to 4 inclusive.

This application is a division of application serial No. 424,806, filed January 21, 1930.

In the truck construction shown, though only one-half of the truck is illustrated, it will of course be appreciated that the other side of the truck embodies the same brake construction.

The railway car truck 10 may be of any construction, being provided with the end connecting members 12 and the transoms 14 disposed between the side frames 16. The side frames are provided with the depending pedestal jaws 18 adapted to have cooperative engagement with the usual journal boxes or other journal means of the wheel and axle assemblies 20. Suitable equalizers 22 are shown as provided between said journal boxes.

The brake rigging includes the dead truck levers 24 pivoted to suitable brackets 26 as at 28, said brackets being provided on the end transverse connecting members 12, preferably in the plane of the wheels. Suitable brake heads 30 provided with shoes 32 are pivoted as at 34 to the truck levers 24 intermediate the ends thereof, and the brake heads on opposite sides of the truck are connected and spaced by brake head tie straps 35. The lower ends of said truck levers are pivotally mounted as at 36 to the slotted heads 38 of the slack adjuster pull rods 40 disposed below the axle or wheel centers, the slack adjuster 42 being disposed on the heads thereof.

The inner ends of the pull rods 40 are pivotally connected as at 44 to the lower ends of the live truck levers 46, said levers on opposite sides of the truck being connected and spaced by the tie straps 47. The live truck levers are provided with brake heads 48 provided with the brake shoes 50, the brake heads being pivotally connected as at 52 to the live truck levers 46 intermediate the ends thereof and to the ends of the brake hangers 54, said brake hangers being pivoted as at 56 adjacent the upper ends thereof to the car truck. The upper end of the live truck lever 46, disposed at the left end of the truck as viewed in Figures 3 and 4, is pivoted as at 58 to the links or clevises 60 which are pivoted as at 62 to the inner end of the equalizing lever 64. The equalizing lever 64 is a dead lever, being selectively pivoted as at 66 to the strap links 68 of the fulcrum bracket 70 secured to the side frame, the outer end of the equalizing lever 64 is selectively pivoted as at 72 to the pull rod 74, the other end of the pull rod being pivoted as at 76 to the outer end of the equalizing lever 78 supported on bracket 79. The inner end of said equalizing lever is pivoted as at 80 to the clevises or links 82 which are pivoted as at 84 to the live truck lever 46 disposed at the right of the truck.

The live equalizing lever 78 is pivoted intermediate the ends thereof as at 86 to the pull rod 88, the opposite end of said pull rod being pivoted as at 90 to the dead fulcrum lever 92 intermediate the ends thereof. The outer end of said fulcrum lever is pivoted as at 94 to the fulcrum bracket 96 disposed on the side frame and provided with the fulcrum lever support 97. The inner end of the fulcrum lever is pivoted as at 98 to pull rod 100 which is pivoted as at 102 to the horizontal equalizer 104 carried on the support 105 secured to the car underframe and provided with suitable means 106 for connection to a hand operated brake operating means or to power operating means.

The pull rod 88 is provided with the bracket 108 disposed adjacent the lever 78, said bracket being provided with a release spring rod 110 slidably mounted in the release spring bracket 112. The spring 114 is disposed between the bracket 112 and the washer or head 116 provided on the release spring rod 110, the spring 114 being a compression spring and normally urging the brake rigging toward the left as viewed in the figures, that is, toward release position.

In order to apply the brakes, therefore, operation of the hand or power means moves the horizontal equalizer 104 toward the right as viewed in the figures, causing the pull rod 100 to move the fulcrum lever 92 in a clockwise direction about the pivot 94. Movement of the fulcrum lever 92 exerts a pull on the pull rod 88, compressing the spring 114 and bodily moving the live equalizing lever 78 on its supporting bracket 79 toward the right. Movement of the equalizing lever 78 toward the right causes the upper end of the live truck lever 46 at the right to move to apply its brake shoe to the wheel and axle assembly.

Continued movement causes the live truck lever 46 to pivot around the point 52 to cause the lower end thereof to move toward the left or in a clockwise direction whereby the pull rod 40 will be moved toward the left to move the dead truck lever 24 at the right of the figure to apply its brake shoe. The said continued movement of the equalizing lever 78 causes a pull on the pull rod 74, moving the dead fulcrum lever 64 in a counter-clockwise direction around the pivot 66. This movement causes the upper end of the live truck lever 46 at the left to move to apply its brake shoe to its associated wheel.

Continued movement of the live truck lever causes a pivotal movement around its pivot 52 to move its associated pull rod 40 toward the right as viewed in the figure whereby the dead truck lever 24 at the left of the figures moves in a counter-clockwise direction to cause engagement between its brake shoe and the associated wheel. Release of the hand or power operated means permits the spring 114 to move the pull rod 88 toward the left as viewed in the figures to cause release of the brake rigging in a manner opposite to that described for setting.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake rigging, the combination with a truck frame, of truck levers pivoted to said frame, horizontal levers connected to certain of said truck levers, a pull rod having connection to one of said horizontal levers, an equalizer, and means pivoted to the frame for connecting said equalizer with the pull rod.

2. In a brake rigging, the combination with a truck frame, of truck levers pivoted to said frame, horizontal levers connected to certain of said truck levers, a pull rod having connection to one of said horizontal levers, an equalizer, a fulcrum lever having pivoted connection with the frame and with said pull rod and means for connecting said equalizer to said fulcrum lever.

3. In a brake rigging, the combination with a truck frame, of truck levers pivoted to said frame, horizontal levers having connection with certain of said truck levers, an equalizing lever operatively connected by pull rods to certain of said horizontal levers, a release rod connected to one of the pull rods adjacent one end thereof, said equalizing lever being adapted to be operated to operate one of said horizontal levers, and springs mounted on the release rods for counteracting the movement imparted to the equalizing lever by the operating means.

4. A beamless brake rigging for clasp brakes including truck levers connected to brake shoes applied to opposite sides of each car wheel, a rod connecting the lower ends of said levers, an equalizing lever operatively connected to one truck lever for each wheel, a rod connecting the equalizing levers for adjacent wheels, a fulcrum lever pivoted to the truck and a rod connecting one of said equalizing levers to said fulcrum lever.

5. A beamless brake rigging for clasp brakes including truck levers connected to brake shoes applied to opposite sides of each car wheel, a pull rod connecting the lower ends of said levers, an equalizing lever operatively connected to one truck lever for each wheel, a pull rod connecting the equalizing levers for adjacent wheels, a fulcrum lever pivoted to the truck, and a pull rod connecting one of said equalizing levers to said fulcrum lever.

6. A beamless brake rigging for clasp brakes including truck levers connected to brake shoes applied to opposite sides of each car wheel, a pull rod connecting the lower ends of said levers, an equalizing lever operatively connected to each inside truck lever, a pull rod connecting adjacent equalizing levers on each side of the truck, a fulcrum lever, a pull rod connecting said fulcrum lever and one of said equalizing levers, an equalizer, and a pull rod for connecting said fulcrum lever and equalizer.

7. A beamless brake rigging for clasp brakes including truck levers connected to brake shoes applied to opposite sides of each car wheel, a rod connecting the lower ends of said levers, an equalizing lever operatively connected to each inside truck lever, a rod connecting adjacent equalizing levers on each side of the truck, a fulcrum lever, a rod connecting said fulcrum lever and one of said equalizing levers, an equalizer, and a rod for connecting said fulcrum lever and equalizer.

8. A car brake rigging including truck levers connected to brake shoes on opposite sides of each car wheel, the outside truck levers being dead truck levers, a pull rod connecting the lower ends of the truck lever for each wheel, equalizing levers connected to each inside truck lever, a pull rod connecting said equalizing levers, a fulcrum lever, an equalizer, and pull rods connecting one of said equalizing levers and said fulcrum lever, and said fulcrum lever and said equalizer.

9. A car brake rigging including truck levers connected to brake shoes on opposite sides of each car wheel, the outside truck levers being dead truck levers, a rod connecting the lower ends of the truck levers for each wheel, equalizing levers connected to each inside truck lever, a rod connecting said equalizing levers, a fulcrum lever, an equalizer, and rods connecting one of said equalizing levers and said fulcrum lever, and said fulcrum lever and said equalizer.

10. In a brake arrangement, the combination of a vehicle frame, a wheel associated therewith, live and dead truck levers disposed on opposite sides of said wheel and provided with brake shoes adapted to be applied to said wheel for braking operation thereof, a live equalizing lever connected to one of said truck levers, a connection between said truck levers, a dead fulcrum lever pivoted to said frame and connected to said live equalizing lever, and means for operating said fulcrum lever for brake application.

11. In a brake arrangement, the combination of a vehicle frame, a wheel associated therewith, live and dead truck levers disposed on opposite sides of said wheel and provided with brake shoes adapted to be applied to said wheel for braking operation thereof, a live equalizing lever connected to said live truck lever, a connection between said truck levers, a dead fulcrum lever pivoted to said frame and connected to said live equalizing lever, and means for operating said fulcrum lever for brake application.

12. In a brake arrangement, the combination of a vehicle frame, a pair of wheels associated therewith, live and dead truck levers disposed on opposite sides of each wheel and provided with brake shoes adapted to be applied to said wheels for braking operation thereof, connections between each pair of live and dead truck levers, a dead equalizing lever connected to one of said live truck levers, a live equalizing lever connected to the other of said live truck levers, a connection between said equalizing levers, a dead fulcrum lever pivoted to said frame and connected to said live equalizing lever, and means for operating said fulcrum lever for brake application.

13. In a brake arrangement, the combination of a vehicle frame, a wheel associated therewith, live and dead truck levers disposed on opposite sides of said wheel and provided with brake shoes adapted to be applied to said wheel for braking operation thereof, a live equalizing lever connected to one of said truck levers, a connection between said truck levers, a fulcrum lever connected to said live equalizing lever, and means for operating said fulcrum lever for brake application.

14. In a brake arrangement, the combination of a vehicle frame, a wheel associated therewith, live and dead truck levers disposed on opposite sides of said wheel and provided with brake shoes adapted to be applied to said wheel for braking operation thereof, a live equalizing lever connected to said live truck lever, a connection between said truck levers, a fulcrum lever connected to said live equalizing lever, and means for operating said fulcrum lever for brake application.

15. In a brake arrangement, the combination of a vehicle frame, a pair of wheels associated therewith, live and dead truck levers disposed on opposite sides of each wheel and provided with brake shoes adapted to be applied to said wheels for braking operation thereof, connections between each pair of live and dead truck levers, a dead equalizing lever connected to one of said live truck levers, a live equalizing lever connected to the other of said live truck levers, a connection between said equalizing levers, a fulcrum lever connected to said live equalizing lever, and means for operating said fulcrum lever for brake application.

16. In a brake arrangement, the combination of a vehicle frame, a wheel associated therewith, live and dead truck levers disposed on opposite sides of said wheel and provided with brake shoes adapted to be applied to said wheel for braking operation thereof, a connection between said truck levers, an equalizing lever connected to one of the truck levers, a dead fulcrum lever pivoted to said frame and connected to said equalizing lever, and means for operating said fulcrum lever for brake application.

17. In a brake arrangement, the combination of a vehicle frame, a wheel associated therewith, truck levers supported on said frame and disposed on opposite sides of said wheel, said truck levers being provided with brake shoes adapted to be applied to said wheel for braking operation thereof, a connection between said truck levers, an equalizing lever connected to one of said truck levers, a fulcrum lever connected to said equalizing lever, and means for operating said fulcrum lever for brake application.

18. In a brake arrangement, the combination of a vehicle frame, a pair of wheels associated therewith, truck levers disposed on opposite sides of each wheel and provided with brake shoes adapted to be applied to said wheels for braking operation thereof, connections between pairs of truck levers associated with each wheel, equalizing levers connected to one of each pair of truck levers, a connection between said equalizing levers, a fulcrum lever connected to one of said equalizing levers, and means for operating said fulcrum lever for brake application.

19. In a brake arrangement, the combination of a vehicle frame, a wheel associated therewith, a truck lever supported on said frame and provided with a brake shoe adapted to be applied to said wheel for braking operation thereof, an equalizing lever connected to said truck lever, a fulcrum lever connected intermediate the ends thereof to said equalizing lever, and means for operating said fulcrum lever for brake application.

20. In a brake arrangement, the combination of a vehicle frame, a pair of wheels associated therewith, truck levers supported on said frame and disposed adjacent each wheel, said truck levers each having a brake shoe adapted to be applied to the respective wheels for braking operation thereof, equalizing levers connected to each truck lever, a connection between equalizing levers, a fulcrum lever connected to one of said equalizing levers, and means for operating said fulcrum lever for brake application.

21. In a brake arrangement, the combination of a vehicle frame, a pair of wheels associated therewith, truck levers supported on said frame and disposed adjacent each wheel, said truck levers each having a brake shoe adapted to be applied to the respective wheels for braking operation thereof, a dead equalizing lever connected to one of said truck levers, a live equalizing lever connected to the other of said truck levers and to said dead equalizing lever, a fulcrum lever connected to one of said equalizing levers, and means for operating said fulcrum lever for brake application.

22. In a brake arrangement, the combination of a vehicle frame, a pair of wheels associated therewith, truck levers supported on said frame and disposed adjacent each wheel, said truck levers each having a brake shoe adapted to be applied to the respective wheels for braking operation thereof, a dead equalizing lever connected to one of said truck levers, a live equalizing lever connected to the other of said truck levers and to said dead equalizing lever, a dead fulcrum lever connected to one of said equalizing levers, and means for operating said fulcrum lever for brake application.

23. In a brake arrangement, the combination of a vehicle frame, a pair of wheels associated therewith, truck levers supported on said frame and disposed adjacent each wheel, said truck levers each having a brake shoe adapted to be applied to the respective wheels for braking operation thereof, a dead equalizing lever connected to one of said truck levers, a live equalizing lever connected to the other of said truck levers and to said dead equalizing lever, a fulcrum lever connected to said live equalizing lever, and means for operating said fulcrum lever for brake application.

24. In a brake arrangement, the combination of a vehicle frame, a pair of wheels associated therewith, truck levers supported on said frame and disposed adjacent each wheel, said truck levers each having a brake shoe adapted to be applied to the respective wheels for braking operation thereof, a dead equalizing lever connected to one of said truck levers, a live equalizing lever connected to the other of said truck levers and to said dead equalizing lever, a dead fulcrum lever connected to said live equalizing lever, and means for operating said fulcrum lever for brake application.

25. In a brake arrangement, the combination of a vehicle frame, a wheel associated therewith, truck levers supported on said frame and disposed on opposite sides of said wheel, said truck levers being provided with brake shoes adapted to be applied to said wheel for braking operation thereof, a connection between said truck levers, an equalizing lever connected to one of said truck levers, a fulcrum lever connected to said equalizing lever, means for operating said fulcrum lever for brake application, and means between said fulcrum and equalizing levers for moving said shoes away from said wheel upon release of said first named means.

26. In a brake arrangement, the combination of a vehicle frame, a pair of wheels associated therewith, truck levers disposed on opposite sides of each wheel and provided with brake shoes adapted to be applied to said wheels for braking operation thereof, connections between pairs of truck levers associated with each wheel, equalizing levers connected to one of each pair of truck levers, a connection between said equalizing levers, a fulcrum lever connected to one of said equalizing levers, means for operating said fulcrum lever for brake application, and means between said fulcrum and equalizing levers for moving said shoes away from said wheel upon release of said first named means.

27. In a brake arrangement, the combination of a vehicle frame, a pair of wheels associated therewith, truck levers supported on said frame and disposed adjacent each wheel, said truck levers each having a brake shoe adapted to be applied to the respective wheels for braking operation thereof, a dead equalizing lever connected to one of said truck levers, a live equalizing lever connected to the other of said truck levers and to said dead equalizing lever, a fulcrum lever connected to one of said equalizing levers, means for operating said fulcrum lever for brake application, and means between said fulcrum and equalizing levers for moving said shoes away from said wheel upon release of said first named means.

28. In a brake arrangement, the combination of a vehicle frame, a pair of wheels associated therewith, truck levers supported on said frame and disposed adjacent each wheel, said truck levers each having a brake shoe adapted to be applied to the respective wheels for braking operation thereof, a dead equalizing lever connected to one of said truck levers, a live equalizing lever connected to the other of said truck levers and to said dead equalizing lever, a dead fulcrum lever connected to said live equalizing lever, means for operating said fulcrum lever for brake application, and means between said fulcrum and equalizing levers for moving said shoes away from said wheel upon release of said first named means.

29. In a brake arrangement, the combination of a vehicle frame, a wheel associated therewith, a truck lever supported on said frame and provided with a brake shoe adapted to be applied to said wheel for braking operation thereof, an equalizing lever connected to said truck lever, a fulcrum lever connected to said equalizing lever, means for operating said fulcrum lever for brake application, and means between said fulcrum and equalizing levers for moving said shoe away from said wheel upon release of said first named means.

30. In a brake arrangement, the combination of a vehicle frame, a wheel associated therewith, a truck lever supported on said frame and provided with a brake shoe adapted to be applied to said wheel for braking operation thereof, an equalizing lever connected to said truck lever, a fulcrum lever connected to said equalizing lever and pivoted adjacent one end thereof to said vehicle frame, and means for operating said fulcrum lever for brake application.

WALTER H. BASELT.